United States Patent [19]

Sawahata

[11] Patent Number: 5,912,824
[45] Date of Patent: Jun. 15, 1999

[54] ION IMPLANTATION SIMULATION METHOD

[75] Inventor: Koichi Sawahata, Tokyo, Japan

[73] Assignee: NEC Corporation, Tokyo, Japan

[21] Appl. No.: 08/932,642

[22] Filed: Sep. 17, 1997

[30] Foreign Application Priority Data

Sep. 18, 1996 [JP] Japan ................................. 8-246129

[51] Int. Cl.$^6$ ................................................. G06F 11/30
[52] U.S. Cl. ........................................... 364/578; 395/500
[58] Field of Search ........................... 364/578; 395/500; 438/20, 22, 961, 920; 257/611

[56] References Cited

U.S. PATENT DOCUMENTS

| | | | |
|---|---|---|---|
| 3,765,956 | 10/1973 | Li ................................................ | 148/33 |
| 4,136,435 | 1/1979 | Li ................................................ | 29/572 |
| 4,371,406 | 2/1983 | Li ................................................ | 148/71 |
| 5,420,049 | 5/1995 | Russel et al. .............................. | 437/24 |
| 5,737,250 | 4/1998 | Sawahata .................................. | 364/578 |
| 5,787,269 | 7/1998 | Hyodo ....................................... | 395/500 |

OTHER PUBLICATIONS

Yang et al; "A More Efficient Approach for Monte Carlo Simulation of Deeply–Channeled Implanted Profiles in SIngle–Crystal Silicon"; 1994; pp. 97–100; IEEE.

Dan; "Process Device Simulation Technology"; 1988; pp. 60–62; Sangyo Tosho Kabushiki Gaisha.

*Primary Examiner*—Kevin J. Teska
*Assistant Examiner*—Matthew Loppnow
*Attorney, Agent, or Firm*—Hayes, Soloway, Hennessey, Grossman & Hage, P.C.

[57] ABSTRACT

Disclosed is an ion implantation simulation method including calculating a particle scattering process of each of sample particles as a simulation target using a Monte Carlo method, determining that the particle has stopped when scattering calculation gives zero energy of the particle, continuously performing the scattering calculation when the energy is not 0. When the scattering calculation yields an energy of the particle that has decreased to $\alpha$ ($0 \leq \alpha \leq 1$) times the energy value at the time of implantation, the particle Is divided into a predetermined number N (N is an integer) such that the weight of the particle after division becomes 1/N that before division. The scattering calculation and the particle division process is repeated until particles having non-zero energy values are divided the predetermined number of times M (M is an integer) counting from the first division, and consequently, the weight of the particle becomes $1/N^M$ that of the initially implanted particle, performing the scattering calculation for particles which have been divided the predetermined number of times M until the energy value becomes 0, and determining the positions where the energy values of all the sample particles become 0 as stop positions in a substrate, thereby obtaining an impurity distribution.

2 Claims, 4 Drawing Sheets

ION IMPLANTATION SIMULATION METHOD

BACKGROUND OF THE INVENTION

1. FIELD OF THE INVENTION

The present invention relates to ion implantation for impurity doping in a semiconductor manufacturing process and, more particularly, to an ion implantation simulation method Of calculating a distribution of impurity particles which are ion-implanted into a substrate and stop at certain positions because of the energy loss after repetitive collision against the substrate.

2. DESCRIPTION OF THE PRIOR ART

Ion implantation simulation using a Monte Carlo method (to be referred to as "Monte Carlo ion implantation simulation" hereinafter) is described in Ryo Dan, "Process Device Simulation Technology", p. 60. In this ion implantation simulation, a process that implanted ions scatter and lose energy while colliding against atomic nuclei and electrons in the substrate is calculated using a probabilistic technique. More specifically, a random number is generated for every collision process to determine the relative position with respect to a target atom, i.e., a collision parameter. Scattering (energy transition and direction) of the implanted ions is calculated on the basis of the collision parameter, thereby obtaining the distribution of impurity particles which have finally stopped in the substrate. In this specification, calculation of the scattering process of implanted ions using the above-described Monte Carlo method will be referred to as "scattering calculation" hereinafter.

To accurately calculate the distribution using this simulation method, a lot of trajectories of implanted ions must be calculated, resulting in a very long calculation time. A solution to this problem is described in S. H. Yang et al., "A More Efficient Approach for Monte Carlo Simulation of Deeply-Channeled Implanted Profiles in Single-Crystal Silicon", NUPAD V, pp. 97–100, (1994).

According to this technique, Monte Carlo ion implantation simulation is performed first using a certain number of sample particles to obtain an impurity profile as shown in FIG. 1A. Next, with reference to the resultant profile, positions in the depth direction where the sample particles are divided are determined. These positions are represented by $d_1$, $d_2$, and $d_3$ in FIG. 1B. Sample particles which have reached the depths $d_1$, $d_2$, and $d_3$ are divided, and the Monte Carlo ion implantation simulation is performed again. With this process, a profile whose tail portion has minimum noise can be obtained, as shown in FIG. 1B.

In the conventional simulation method, however, simulation can hardly be extended to two or three dimensions. The reason for this is as follows. To extend simulation to two or three dimensions, a function of determining a two- or three-dimensional line segment sequence or plane is required to divide sample particles.

SUMMARY OF THE INVENTION

It is an object of the present invention to provide a Monte Carlo ion implantation simulation method which allows more accurate ion implantation simulation not only for a one-dimensional structure but also for a two- or three-dimensional structure without prolonging the calculation time.

In order to achieve the above object, according to the present invention, there is provided an ion implantation simulation method comprising calculating a particle scattering process of each of sample particles as a simulation target using a Monte Carlo method, determining that the particle has stopped when scattering calculation yields zero energy of the particle, continuously performing the scattering calculation when the energy is not 0, when the scattering calculation yields an energy of the particle that has decreased to $\alpha$ ($0 \leq \alpha \leq 1$) times the energy value at the time of implantation, dividing the particle divided into a predetermined number N (N is an integer) such that a weight of the particle after division becomes 1/N that before division, further calculating the scattering process for the particle after division, determining that the particle has stopped when the energy becomes 0, when the energy is not 0 and decreases to a ($0 \leq \alpha \leq 1$) times the energy value in the previous division, the particle is further divided into a predetermined number N (N is an integer) such that the weight of the particle after division becomes 1/N that before division, further calculating the scattering process for the particle after division, repeatedly the scattering calculation and the particle division process until particles having non-zero energy values are divided the predetermined number of times M (M is an integer) counting from the first division, and consequently, the weight of the particle becomes $1/N^M$ that of the initially implanted particle, performing the scattering calculation for particles which have been divided the predetermined number of times M until the energy value becomes 0, and determining positions where the energy values of all the sample particles become 0 as stop positions in a substrate, thereby obtaining an impurity distribution.

According to this method, when the Monte Carlo ion implantation simulation is to be performed, particles are divided with reference to the degree of drop in particle energy, so positions where the particles are divided need not be determined in advance. Therefore, the calculation accuracy can be increased without increasing the calculation time. In addition, the simulation method of the present invention can be easily applied to simulation for a two- or three-dimensional structure.

DETAILED DESCRIPTION OF PREFERRED EMBODIMENTS

The present invention will be described below with reference to the accompanying drawings.

In the Monte Carlo ion implantation simulation of the present invention, the scattering process of each sample particle as a simulation target is calculated using a Monte Carlo method. When the scattering calculation gives zero energy of the particle, it is determined that the particle has stopped. Otherwise, the scattering calculation is continued. When the scattering calculation yields an energy of the particle that has decreased to $\alpha$ ($0 \leq \alpha \leq 1$) times the energy value at the time of implantation, the particle is divided into a predetermined number N (N is an integer) such that the weight of the particle after division becomes 1/N that before division. The scattering process of the particle after division is calculated. When the energy becomes 0, it is determined that the particle has stopped. Otherwise, when the energy decreases to $\alpha$ ($0 \leq \alpha \leq 1$) times the energy value in the previous division, the particle is further divided into a predetermined number N (N is an integer) such that the weight of the particle after division becomes 1/N that before division. The scattering process is further calculated for the particle after division. In this way, the scattering calculation and the particle division process are repeated until particles having non-zero energy values are divided a predetermined number of times M (M is an integer) counting from the first division operation, and consequently, the weight of the particle becomes $1/N^M$ that of an initially implanted particle. For particles which have been divided the predetermined number of times M, the scattering calculation is performed until the energy value becomes 0. The positions where the energy values of all implanted particles become 0 are regarded as stop positions in the substrate, thereby calculating the impurity distribution.

Figure 1B:
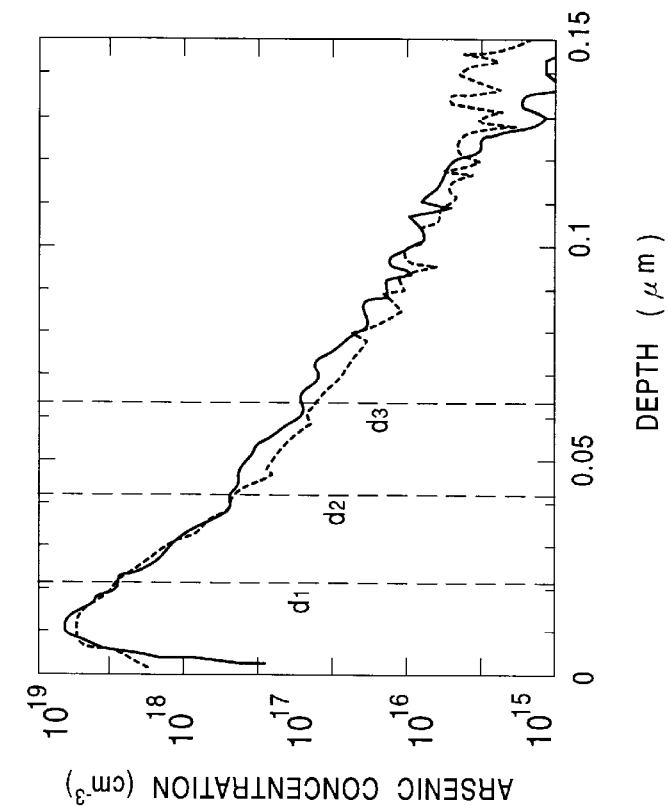
FIG. 1B is a graph showing a profile obtained by performing simulation while dividing the particles at predetermined depths on the basis of the profile obtained in FIG. 1A.
Figure 1A:
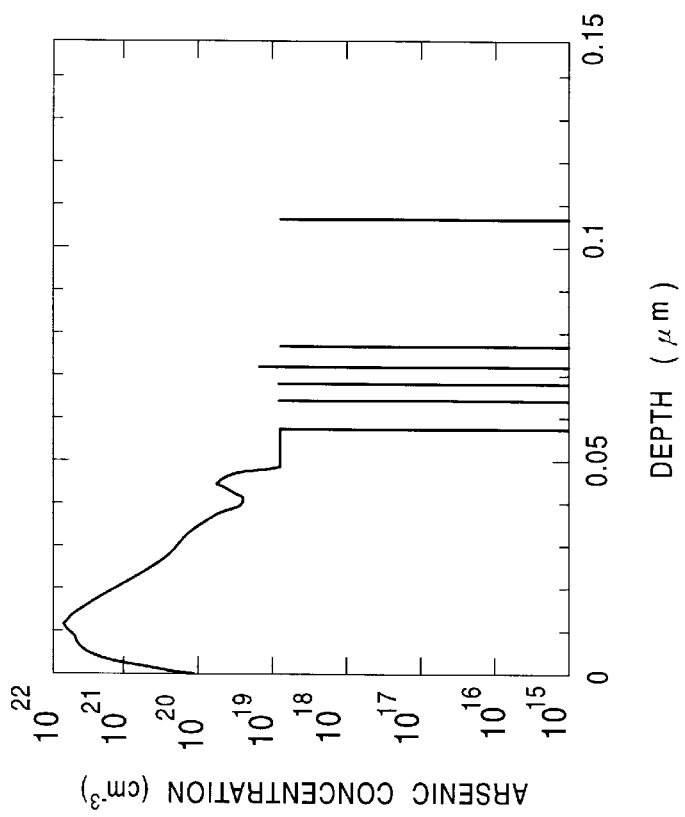
FIG. 1A is a graph showing a profile obtained by performing conventional Monte Carlo ion implantation simulation without division for a predetermined number of particles.
Figure 2:
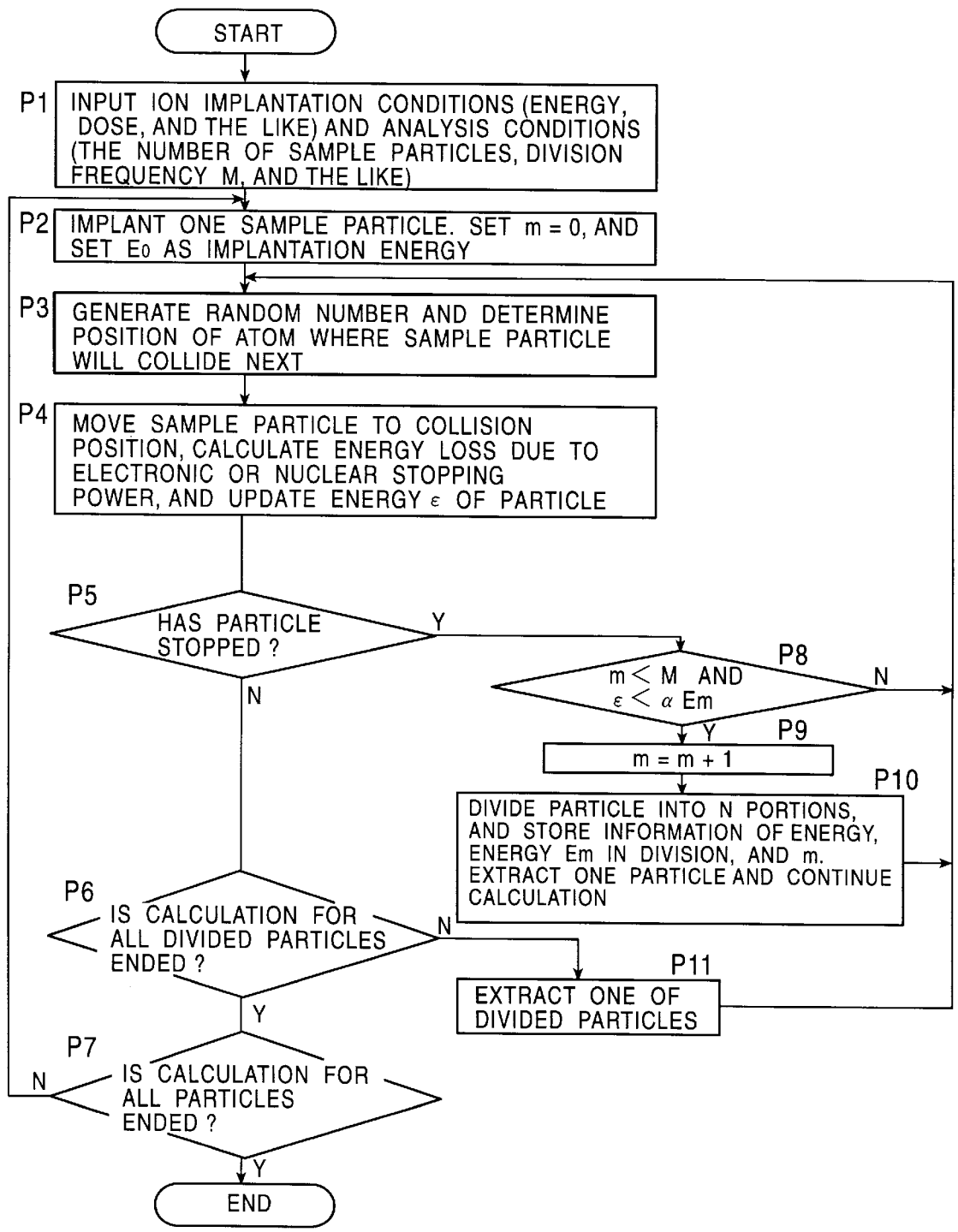
FIG. 2 is a flow chart for explaining a Monte Carlo ion implantation simulation method according to the first embodiment of the present invention.

An ion implantation simulation method according to the first embodiment of the present invention will be described next in detail with reference to the flow chart shown in FIG. 2. In this embodiment, assume that the simulation is done using a computer.

At the start of simulation, simulation setting conditions are input. More specifically, the ion implantation energy, the dose, and the like are input as ion implantation conditions. The number of sample particles as a simulation target, the division frequency M (M is an integer) defining the number of times of division for one particle, the division number N (N is an integer) defining the number of particles obtained by dividing one particle, the division reference multiplier $\alpha$ which is set to execute particle division with reference to a decrease in particle energy value, i.e., to execute particle division when the particle energy value becomes $\alpha$ ($0 \leq \alpha \leq 1$) times that in the previous division, and the like are input as analysis conditions (step $P_1$).

Assuming one sample particle is implanted, scattering calculation is started (step $P_2$). The number of times of division execution is represented by m ($0 \leq m \leq M$). The energy of a particle whose division frequency is m is represented by $E_m$, and an initial energy $E_0$ of a particle whose division frequency is 0 is set as an implantation energy. The energy of a particle at an arbitrary position is represented by $\epsilon$.

A random number is generated, and the position of an atom where the implanted particle will collide next is calculated using the Monte Carlo method (step $P_3$). The energy lose due to the electronic or nuclear stopping power when the implanted sample particle moves to the position where it collides against the atom is calculated on the basis of the calculation in step $P_3$, and the energy $\epsilon$ of the particle is updated on the basis of the calculation (step $P_4$).

Next, it is determined whether the energy $\epsilon$ of the particle, which is updated in step $P_4$, has become 0 (step $P_5$). If YES in step $P_5$, it is determined that the particle has stopped, and the flow advances to step $P_6$. If NO in step $P_5$, the flow advances to step $P_8$ to continuously calculate the trajectory of the particle.

In step $P_8$, it is determined whether the number of times of executed division has reached the predetermined frequency M and whether the energy $\epsilon$ of the particle is $\alpha$ times the energy $E_m$ (or the initial energy $E_0$) in the previous division. More specifically, if inequalities (1) below do not hold, the flow returns to step $P_3$ to continue particle scattering calculation on the basis of the Monte Carlo method:

$$m<M, \text{ and } \epsilon<\alpha E_m \qquad (1)$$

This routine is repeated until the energy $\epsilon$ of the particle becomes 0, or inequalities (1) above are satisfied.

If it is determined in step $P_8$ that inequalities (1) hold, m=m+1. The particle is divided into the predetermined number N (N is an integer) such that the weight of the particle after division becomes 1/N that before division. The flow returns to step $P_3$ to continue the scattering calculation for one of the divided particles. At this time, data of the position, the division frequency M, the energy value $E_m$, the direction, and the weight of each of the N divided particles, except the particle for which calculation is continued, are stored in a predetermined stack area (step $P_{10}$)

A case wherein it is determined in step $P_5$ that the energy $\epsilon$ of the particle is 0 will be described. When the scattering calculation (or the scattering calculation and particle division process) yields zero energy $\epsilon$ of the sample particle as the calculation target, the stack area where data of the divided particles are stored in step $P_{10}$ is accessed to determine whether scattering calculation for all particles divided in step $P_{10}$ is ended (step $P_6$). If NO in step $P_6$, one of the particles stored in the stack area, for which calculation is not ended, is extracted. The flow returns to step $P_3$ to start the scattering calculation on the basis of stored data.

If YES in step $P_6$, it is determined whether calculation for all sample particles is ended (step $P_7$). If NO in step $P_7$, the flow returns to step $P_2$ to start calculation for a particle extracted from the particles for which calculation is not ended.

In this manner, the scattering calculation is performed for all the divided particles. The scattering calculation and particle division process are repeated until particles having non-zero energy values are divided the predetermined number of times M (M is an integer) counting from the first division, and consequently, the weight of the particle becomes $1/N^M$ that of an initially implanted particle. For particles which have been divided the predetermined number of times M, scattering calculation is performed until the energy value becomes 0. The positions where the energy values of all sample particles become 0 are regarded as stop positions in the substrate, thereby obtaining an impurity distribution.

Figure 3A:
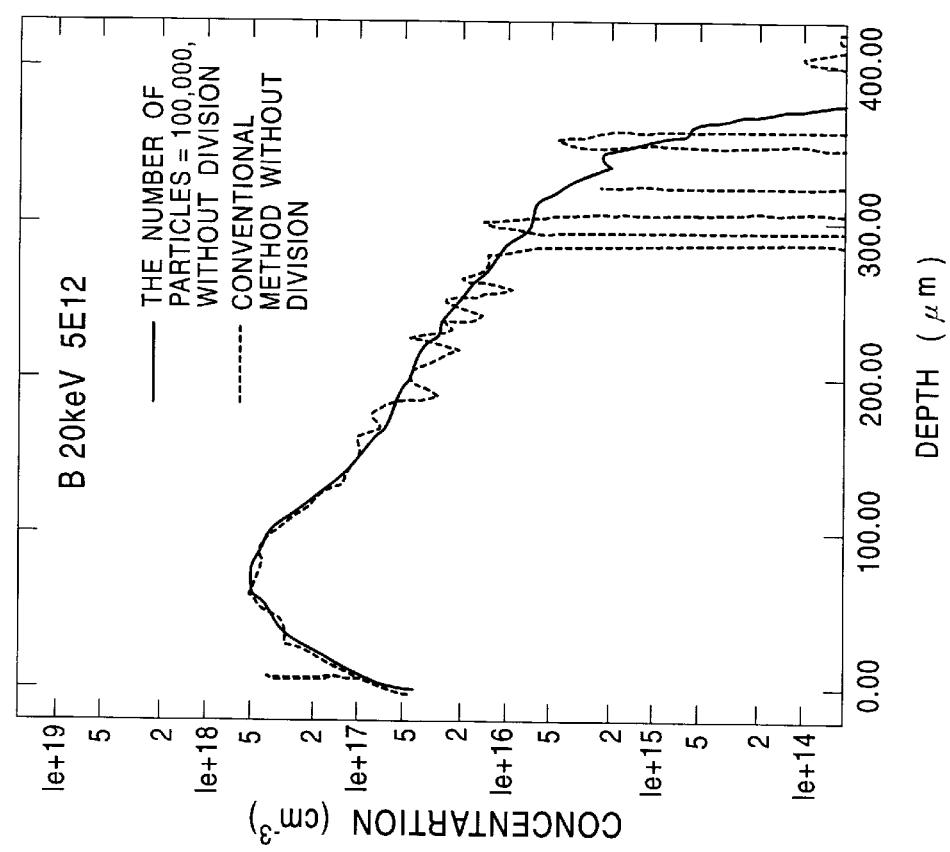
FIG. 3A is a graph showing a profile obtained by performing the Monte Carlo ion implantation simulation of the present invention for 1,000 implanted sample particles.
Figure 3B:
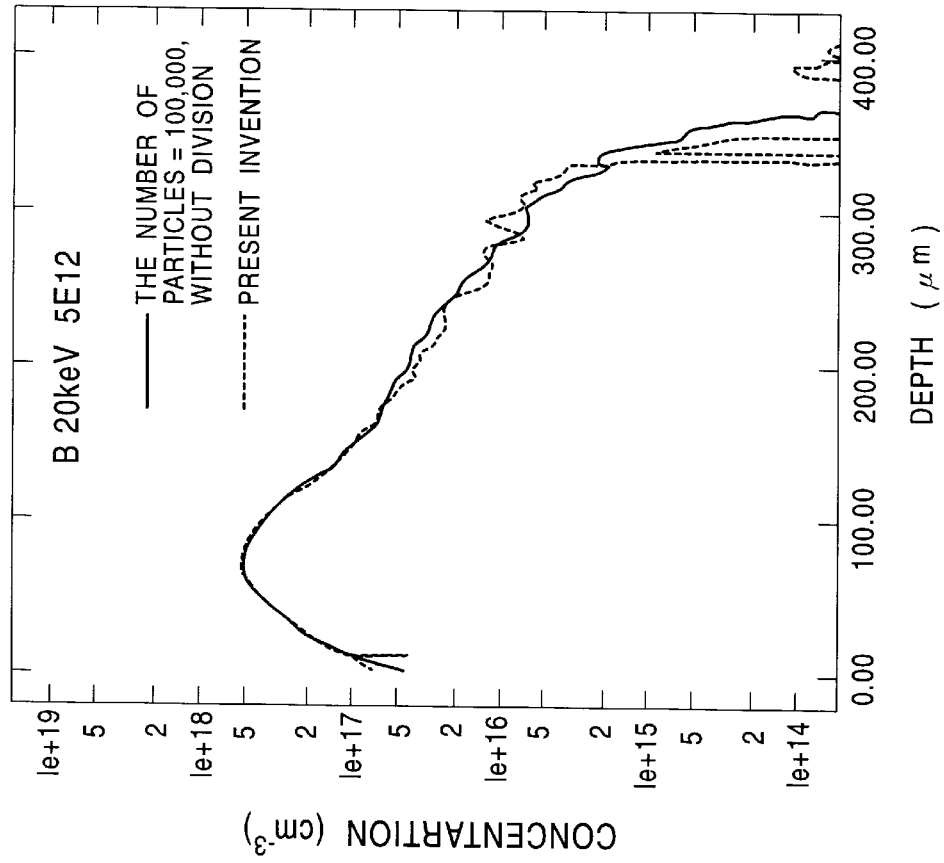
FIG. 3B is a graph showing a profile obtained by performing the conventional Monte Carlo ion implantation simulation without division for 2,500 implanted sample particles.

FIGS. 3A and 3B show actual calculation examples. In FIG. 3A, the dotted line indicates a result obtained by performing the calculation according to the method of the present invention for 1,000 implanted sample particles. As the conditions for calculation, the division frequency M is 4, the number N of particles obtained by one division is 2, and the division reference multiplier $\alpha$ is 0.5. The number of particles finally becomes $2^4=16$ times, i.e., 16,000. Therefore, the calculation takes a longer time than that for calculation without division for 1,000 implanted particles. The solid line in FIG. 3A indicates a calculation result obtained by performing the conventional Monte Carlo ion implantation simulation without division for 100,000 implanted particles.

In FIG. 3B, the dotted line indicates a calculation result obtained by performing the conventional Monte Carlo ion implantation simulation without division for 2,500 implanted sample particles. The solid line in FIG. 3B indicates a calculation result obtained by performing the conventional Monte Carlo ion implantation simulation without division for 100,000 implanted sample particles. The time required to perform calculation for 1,000 particles using of the method of the present invention is almost the same as that required to perform calculation for 2,500 sample particles using the conventional method without division, so the two results are compared with the result of calculation for 100,000 particles.

When the dotted line in FIG. 3A is compared with that in FIG. 3B, calculation according to the present invention yields a more accurate result than that obtained by performing calculation without division for 2,500 sample particles.

Figure 4:
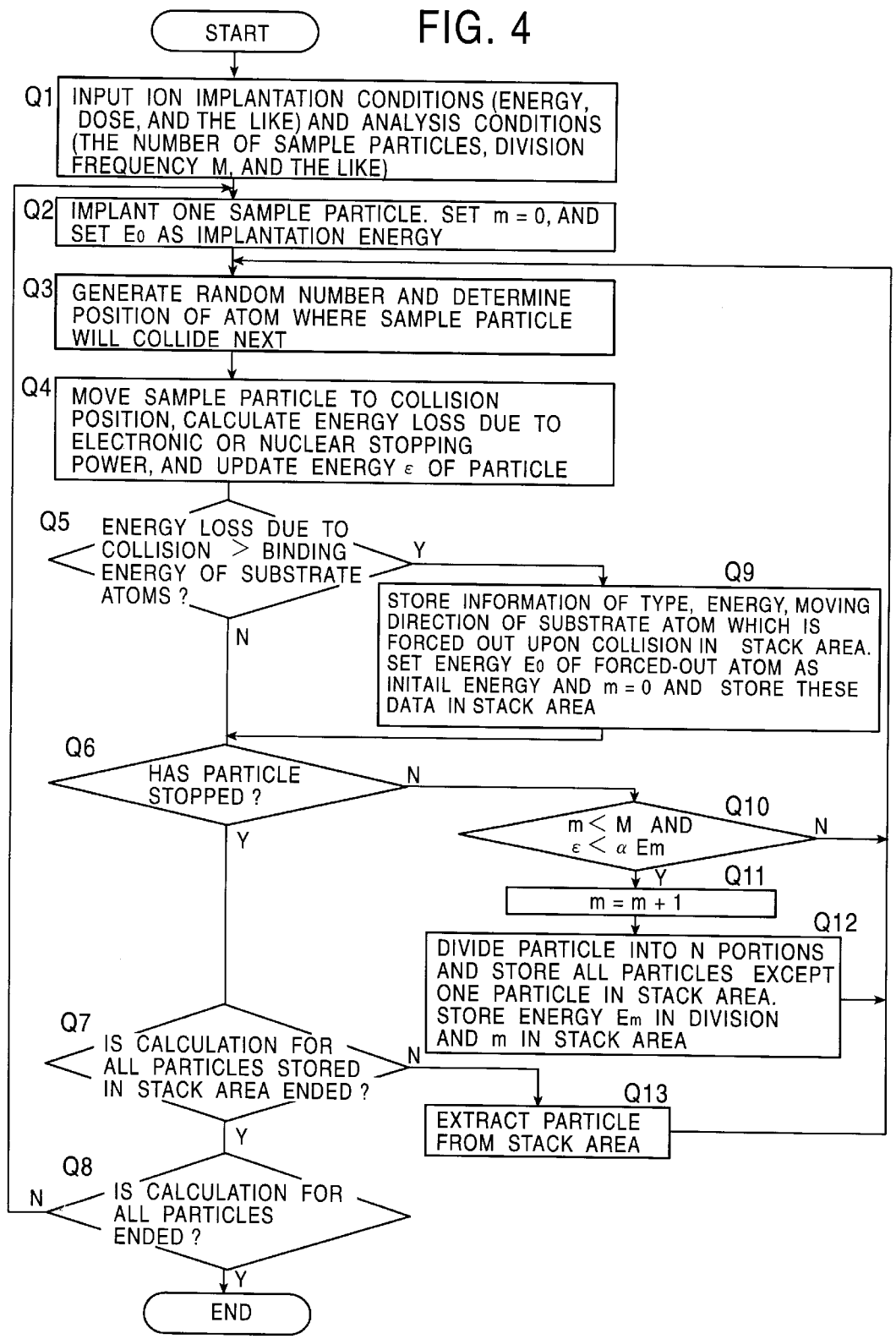
FIG. 4 is a flow chart for explaining a Monte Carlo ion implantation simulation method according to the second embodiment of the present invention.

The second embodiment of the present invention will be described with reference to the flow chart shown in FIG. 4. In this embodiment, ions are implanted into a silicon substrate through, e.g., an oxide film, and when the distribution of oxygen atoms which are forced from the oxide film into the silicon substrate by the implanted particles is to be calculated, the calculation accuracy is increased using the method of the present invention.

At the start of simulation, simulation setting conditions are input. More specifically, the ion implantation energy, the dose, and the like are input as ion implantation conditions. The number of sample particles as a simulation target, a division frequency M (M is an integer) defining the number of times of division for one particle, a division number N (N is an integer) defining the number of particles obtained by dividing one particle, a division reference magnification α which is set to execute particle division with reference to a decrease in particle energy value, i.e., to execute particle division when the particle energy value becomes α ($0 \leq \alpha \leq 1$) times that in the previous division, and the like are input as analysis conditions (step $Q_1$).

Assuming one sample particle is implanted, scattering calculation is started (step $Q_2$). The number of times of division execution is represented by m ($0 \leq m \leq M$). The energy of a particle whose division frequency is m is represented by $E_m$, and an initial energy $E_0$ of a particle whose division frequency is 0 is set as an implantation energy. The energy of a particle at an arbitrary position is represented by $\epsilon$.

A random number is generated, and the position of an atom where the implanted particle will collide next is calculated using the Monte Carlo method (step $Q_3$). The energy loss due to the electronic or nuclear stopping power when the implanted sample particle moves to the position where it collides against the atom is calculated on the basis of the calculation in step $Q_3$, and the energy $\epsilon$ of the particle is updated on the basis of the calculation (step $Q_4$)

In step $Q_5$, it is determined whether the energy loss due to collision is larger than the binding energy of substrate atoms. More specifically, it is determined whether substrate atoms are forced out upon collision. If YES in step $Q_5$, data of the type, energy, and moving direction of atoms forced out upon collision are stored in the stack area in step $Q_9$. The energy of the atom at the division frequency m is represented by $e_m$, and an energy $e_0$ that the atom forced out by the particle whose division frequency is 0 has acquired in step $Q_2$ is represented by $E_0$. These data are also stored in the stack area, and the flow advances to step $Q_6$. In step $Q_6$ and following steps, the atom forced out upon collision is also included in the particle referred in step $Q_6$ and scattering calculation is performed for the particle included the atom.

If NO in step $Q_5$, the flow directly advances to stop $Q_6$.

Next, it is determined whether the energy $\epsilon$ of the particle, which is updated in step $Q_4$, has become 0 (step $Q_6$). If YES in step $Q_6$, it is determined that the particle has stopped, and the flow advances to step $Q_7$. If NO in step $Q_6$, the flow advances to step $Q_{10}$ to continuously calculate the trajectory of the particle.

In step $Q_{10}$, it is determined whether the number of times of executed division has reached the predetermined frequency M and whether the energy $\epsilon$ of the particle is a times the energy $E_m$ (or the initial energy $E_0$) in the previous division (step $Q_{10}$) More specifically, if inequalities (2) below do not hold, the flow returns to step $Q_3$ to continue particle scattering calculation on the basis of the Monte Carlo method:

$$m<M, \text{ and } \epsilon<\alpha E_m \quad (2)$$

This routine is repeated until the energy $\epsilon$ of the particle becomes 0, or inequalities (2) above are satisfied.

If it is determined in step $Q_{10}$ that inequalities (2) hold, m=m+1. The particle is divided into the predetermined number N (N is an integer) such that the weight of the particle after division becomes 1/N that before division. The flow returns to step $Q_3$ to continue the scattering calculation for one of the divided particles. At this time, data of the position, the division frequency M, the energy value $E_m$, the direction, and the weight of each of the N divided particles, except the particle for which calculation is continued, are stored in a predetermined stack area (step $Q_{12}$).

A case wherein it is determined in step $Q_6$ that the energy $\epsilon$ of the particle is 0 will be described. When the scattering calculation (or the scattering calculation and particle division process) yields zero energy $\epsilon$ of the sample particle as the calculation target, the stack area where data of the divided particles are stored in step $Q_{12}$ is accessed to determine whether scattering calculation for all particles divided in step $Q_{12}$ is ended (step $Q_7$). If NO in step $Q_7$, one of the particles stored in the stack area, for which calculation is not ended, is extracted. The flow returns to step $Q_3$ to start the scattering calculation on the basis of stored data.

If YES in step $Q_7$, it is determined whether calculation for all sample particles is ended (step $Q_8$). If NO in step $Q_8$, the flow returns to step $Q_2$ to start calculation for a particle extracted from the particles for which calculation is not ended.

In this manner, the scattering calculation is performed for all the divided particles. The scattering calculation and particle division process are repeated until particles having non-zero energy values are divided the predetermined number of times M (M is an integer) counting from the first division, and consequently, the weight of the particle becomes $1/N^M$ that of an initially implanted particle. For particles which have been divided the predetermined number of times M, scattering calculation is performed until the energy value becomes 0. The positions where the energy values of all sample particles become 0 are regarded as stop positions in the substrate, thereby obtaining an impurity distribution.

With the above method, not only implanted particles but also atoms forced out from the substrate can also be divided to increase the calculation accuracy.

What I claim is:

1. An ion implantation simulation method comprising calculating a particle scattering process of each of sample particles as a simulation target using a Monte Carlo method, determining that the particle has stopped when the scattering calculation yields zero energy of the particle, continuously performing the scattering calculation when the energy is not 0, when the scattering calculation yields an energy of the particle that has decreased to $\alpha$ ($0 \leq \alpha \leq 1$) times the energy value at the time of implantation, dividing the particle divided into a predetermined number N (N is an integer) such that a weight of the particle after division becomes 1/N that before division, further calculating the scattering process for the particle after division, determining that the particle has stopped when the energy becomes 0. when the energy is not 0 and decreases to $\alpha$ ($0 \leq \alpha \leq 1$) times the energy value in the previous division, the particle is further divided into a predetermined number N (N is an integer) such that the weight of the particle after division becomes 1/N that before division, further calculating the scattering process for the particle after division, repeatedly the scattering calculation and the particle division process until particles having non-zero energy values are divided the predetermined number of times M (M is an integer) counting from the first division, and consequently, the weight of the particle becomes $1/N^M$ that of the initially implanted particle, performing the scattering calculation for particles which have been divided the predetermined number of times M until the energy value becomes 0, and determining positions where the energy values of all the sample particles become 0 as stop positions in a substrate, thereby obtaining an impurity distribution.

2. A method according to claim 1, wherein, when an energy loss due to an electronic or nuclear stopping power is larger than a binding energy of substrate atoms at a position where the particle collides against the atom, the atom forced out upon collision is also included in the particle and scattering calculation on the basis of monte Carlo Method is performed.

\* \* \* \* \*